No. 694,638. Patented Mar. 4, 1902.
W. D. HART.
VALVE FOR PNEUMATIC TIRES.
(Application filed July 12, 1901.)
(No Model.)

Witnesses:
Samuel W. Balch
Eugene M. Macdonald

Inventor
William D. Hart,
by Thomas Ewing Jr.
Attorney.

THE NORRIS PETERS CO., PHOTO-LITHO., WASHINGTON, D. C.

UNITED STATES PATENT OFFICE.

WILLIAM D. HART, OF BLOOMFIELD, NEW JERSEY, ASSIGNOR OF ONE-HALF TO EUGENE M. MACDONALD, OF GLENRIDGE, NEW JERSEY.

VALVE FOR PNEUMATIC TIRES.

SPECIFICATION forming part of Letters Patent No. 694,638, dated March 4, 1902.

Application filed July 12, 1901. Serial No. 68,042. (No model.)

*To all whom it may concern:*

Be it known that I, WILLIAM D. HART, a citizen of the United States of America, residing at Bloomfield, Essex county, New Jersey, have invented certain new and useful Improvements in Valves for Pneumatic Tires, of which the following is a specification.

The valve-casing of the valve consists of a tube which is suitably secured in the wall of a pneumatic tire or other air-chamber with which it may be used and is threaded at its outer end for the reception of a coupling of an air-supply pipe and at its inner end it is threaded to receive a valve-plug. The valve-plug is screwed into the inner end of the casing and is provided with a flange which contacts with the inner end of the casing and closes the valve. Suitable air passage-ways are provided through the coupling and valve to a point at the inner end of the valve-casing and under the flange of the valve-plug. The coupling is screwed into the outer end of the casing, and there is a key connection between the coupling and the valve-plug by which the attachment of the coupling effects the partial unscrewing of the valve-plug and opening of the valve, and the removal of the coupling effects the screwing up of the valve-plug and the closure of the valve. The tube forming the casing is threaded through from end to end, the inner end of the thread receiving the valve-plug and the outer end of the thread receiving the coupling. The valve is so constructed that when the coupling is removed it will lie nearly flush with the outside of the pneumatic tire, and it is conveniently so located in the wall of the tire that the rim of the wheel will cover one side of the tire-clamping flange by which the valve-casing is secured to the tire, or cover so much of the valve as is possible while leaving the tube uncovered and outside the edge of the rim for the attachment of the coupling.

Figure 1:
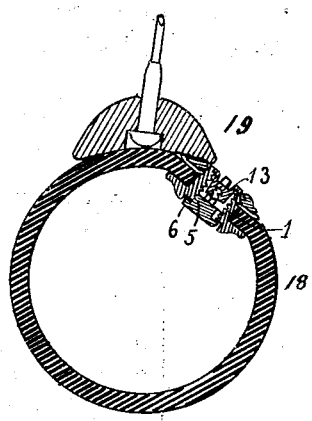
Figure 2:
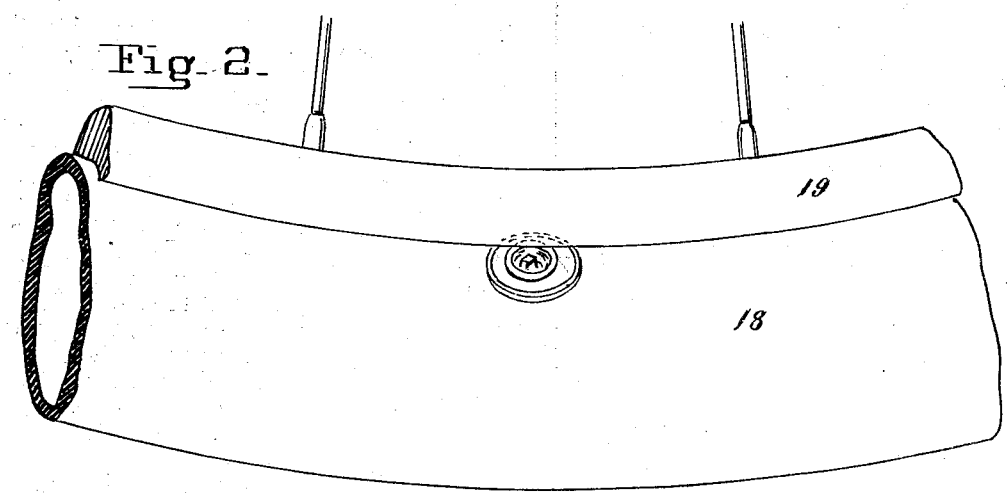
Figure 3:
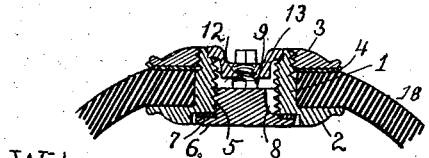
Figure 4:
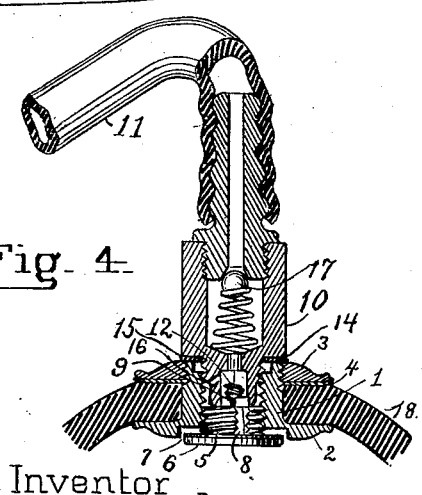

In the accompanying sheet of drawings, which form a part of this specification, Figure 1 is a section through one side of a bicycle-wheel, showing the rim, pneumatic tire, and valve. Fig. 2 is a side view of a portion of the wheel, showing the rim, tire, and valve. Fig. 3 is a section, drawn to a larger scale and showing the valve when closed and covered by a cap. Fig. 4 is a section, also drawn to a larger scale and showing the valve open, the cap being removed, and the coupling to the air-supply pipe being screwed on.

The valve-casing consists of a tube 1, of metal, with a tire-clamping flange 2, which is a part of the tube. The other end of the tube is threaded outside for the reception of the tire-clamping flange 3. Under this flange is a metal washer 4. This casing lies in the wall of the pneumatic tire. The tubular casing is threaded inside right-hand from end to end, and a flanged valve-plug of metal having a threaded end 5 and flange 6 is screwed into the inner end of the casing. A packing-ring 7 lies on the flange of the valve-plug. A notch 8 along one side of the threaded end of the plug affords an air-passage from the interior of the valve to the inner end of the casing, so that when the valve-plug is unscrewed sufficiently to separate its flange from the inner end of the casing a passage-way for air will be opened through the valve into the pneumatic tire. The valve-plug has a square post 9, which is engaged by a socket on the end of the coupling 10 of the air-supply pipe 11 to open and close the valve. The square post and socket constitute a key connection between the coupling and the valve-plug. Any equivalent key connection could obviously be substituted for the one illustrated. Above the square part of the post of the valve-plug is a stem 12, which is threaded left-hand. The cap 13 is screwed onto this stem.

The coupling has a flange 14, with a packing-ring 15, which seats against the outer end of the valve-casing when it is screwed to the valve. There is a passage-way for air from the air-supply pipe through the coupling into the chamber of the valve-casing. This passage-way leads through the socket of the coupling, and if this is insufficient an additional passage-way 16 may be provided. If the air-supply pipe is from a pump, the coupling is preferably provided with a spring-closed check-valve 17; but this is not essential to the invention, since it contributes to the operation of the pump and is a part of the pump and not of the valve and would not be essential if the supply-pipe were led from an air-reservoir. The check-valve is in no case a permanent part of the valve in the tire.

The valve is secured and sealed in the wall of a pneumatic tire 18 by the engagement of the inner tire-clamping flange 2 and the outer tire-clamping flange 3 with, respectively, the interior and outer sides of the tire. In the form shown the valve is located in the tire at one edge of the rim 19, so that one side of the outer tire-clamping flange will be under the rim and between the rim and the tire. The valve is preferably located as near the inner margin of the tire and as much under the rim as possible and lies outside the edge of the rim only sufficiently for the reception of the supply-pipe.

To inflate the tire, the cap is first removed and the coupling is then threaded in the end of the valve, when the socket in the end of the coupling will engage with the square post on the end of the valve-plug. Rotation of the coupling will unscrew the valve-plug, thereby freeing the flange of the plug from its seat against the inner end of the casing and opening the valve from the coupling into the pneumatic tire. At the same time the coupling will be screwed into the valve until its flange is seated against the outer end of the valve-casing. Air is then conducted into the tire from any suitable source, as a pump or reservoir, under pressure. The thread on the end of the coupling has fewer turns than the thread on the valve-plug, so that the number of turns necessary to screw on the coupling will not entirely unscrew the valve-plug, but will merely loosen it and leave its threaded end still caught in the valve-casing, so that when the coupling is again unscrewed the valve-plug will be again screwed into the casing and the flange will be brought up against the inner end of the casing and the valve closed. When the coupling has been removed, a cap is put on the valve for further protection and security. Since this cap is screwed to the valve-plug, it serves as a lock, and the screw connection is of opposite hand to the screw connection between the valve-plug and the valve-casing, so that in event of the binding of the screw connection between the cap and plug the screwing on of the cap will tighten rather than loosen the valve-plug in the valve-casing.

While the foregoing description and attached drawings set forth the preferred form of my invention, I do not limit myself to any particular material for the construction of the valve, nor to any special shaping of the parts, except such as may be necessary to produce the novel functions performed by the combination of elements set forth in the claims.

What I claim as new, and desire to secure by Letters Patent of the United States, is—

1. In a valve, a tubular casing threaded at its inner end, a flanged valve-plug screwed into the threaded inner end of the tubular casing and closing the valve by the contact of the flange with the inner end of the casing, an air passage-way from the interior of the casing to the flange of the valve-plug, a coupling for an air-supply pipe, means for connecting the coupling to the outer end of the tubular casing, and a key connection between the coupling and the valve-plug, whereby the screwing on and off of the coupling opens and closes the valve, substantially as described.

2. In a valve, a tubular casing interiorly threaded from end to end, a flanged valve-plug screwed into the threaded inner end of the tubular casing and closing the valve by the contact of the flange with the inner end of the casing, an air passage-way from the interior of the casing to the flange of the valve-plug, a coupling for an air-supply pipe screwed into the threaded outer end of the tubular casing, and a key connection between the coupling and the valve-plug, whereby the screwing on and off of the coupling opens and closes the valve, substantially as described.

3. In a valve, a tubular casing threaded at its inner end, a flanged valve-plug screwed into the threaded inner end of the tubular casing and closing the valve by the contact of the flange with the inner end of the casing, an air passage-way from the interior of the casing to the flange of the valve-plug, a cap for the valve, and a screw connection between the cap and the valve-plug of opposite hand to the screw connection between the tubular casing and the valve-plug, substantially as described.

4. In a bicycle-wheel, the combination with a rim, and a pneumatic tire attached thereto, of a valve the casing of which is secured in the wall of the tire by means of tire-clamping flanges, the valve being so located in the wall of the tire that one side of the outer flange will be protected and supported by the rim and the outer end of the tubular valve-casing will lie outside the rim for the reception of a coupling of an air-supply pipe, substantially as described.

Signed by me at Bloomfield, New Jersey, this 9th day of July, 1901, in the presence of two witnesses.

WILLIAM D. HART.

Witnesses:
ERNEST RAAFLAUK,
EUGENE M. MACDONALD.